United States Patent [19]
Agarwal et al.

[11] Patent Number: 6,007,228
[45] Date of Patent: Dec. 28, 1999

[54] MASTER DIGITAL MIXER WITH DIGITAL-AUDIO LINKS TO EXTERNAL AUDIO IN A DOCKING STATION AND TO INTERNAL AUDIO INSIDE A PORTABLE PC

[75] Inventors: Suresh Agarwal, San Jose; Krishnan C. Dharmarajan, Fremont, both of Calif.

[73] Assignee: NeoMagic Corp., Santa Clara, Calif.

[21] Appl. No.: 08/859,862

[22] Filed: May 21, 1997

[51] Int. Cl.[6] .............................. G06F 17/00; G06G 7/48
[52] U.S. Cl. ...................... 364/400.01; 381/119; 361/683
[58] Field of Search ..................... 381/119, 306, 381/333, 91; 364/400.01; 361/683, 686; 369/4

[56] References Cited

U.S. PATENT DOCUMENTS

| | | |
|---|---|---|
| 5,007,050 | 4/1991 | Kasparian et al. . |
| 5,297,231 | 3/1994 | Miller . |
| 5,349,640 | 9/1994 | Dunn et al. . |
| 5,359,626 | 10/1994 | Kloker et al. . |
| 5,396,400 | 3/1995 | Register et al. . |
| 5,481,616 | 1/1996 | Freadman . |
| 5,491,498 | 2/1996 | Koyama et al. . |
| 5,493,542 | 2/1996 | Odelid . |
| 5,604,663 | 2/1997 | Shin et al. ................................ 361/686 |
| 5,768,126 | 6/1998 | Frederick ..................................... 369/4 |
| 5,835,733 | 11/1998 | Walsh et al. ............................. 361/683 |

*Primary Examiner*—Ping Lee
*Attorney, Agent, or Firm*—Stuart T. Auvinen

[57] ABSTRACT

A multimedia notebook or laptop personal computer (PC) has an enhanced audio system. An external audio controller in a docking station is connected to the laptop PC's audio system using a digital-audio link. The digital-audio link uses digital signals that have high noise immunity. The high noise immunity allows the digital-audio signals to be routed through the inexpensive docking connector, which has many other noisy, high-speed signals. Dedicated, expensive, noise-prone, and difficult-to-connect analog-audio connectors between the laptop PC and the docking station are eliminated. Analog-digital converter audio CODEC's are placed in both the docking station and in the laptop PC. A master mixer in the laptop PC mixes digital audio from the external audio controller in the docking station with digital audio from an external audio controller inside the laptop PC. The master mixer also connects to a zoom-video audio port and to an internal PCI bus for storing and retrieving audio clips. Audio from external docking-station sources and from internal sources can be freely mixed with the master mixer connected to local mixers in the audio controllers. Audio can be simultaneously played to both internal and external docking-station speakers.

6 Claims, 9 Drawing Sheets

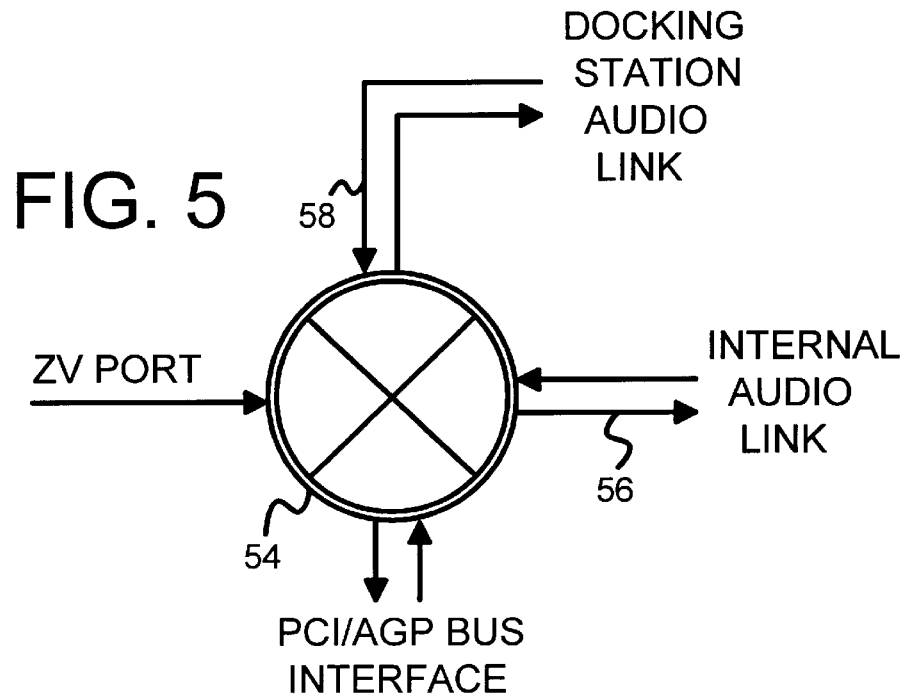
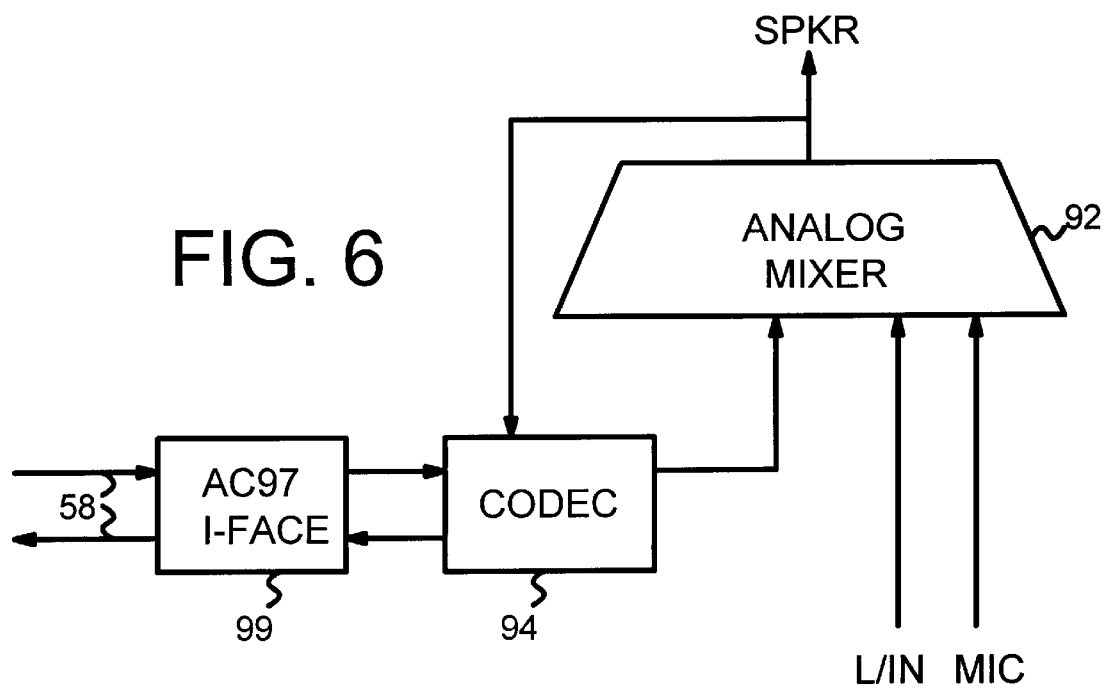

MASTER DIGITAL MIXER WITH DIGITAL-AUDIO LINKS TO EXTERNAL AUDIO IN A DOCKING STATION AND TO INTERNAL AUDIO INSIDE A PORTABLE PC

BACKGROUND OF THE INVENTION—FIELD OF THE INVENTION

This invention relates to portable multimedia computers, and more particularly to a digital audio link to a docking station.

BACKGROUND OF THE INVENTION—DESCRIPTION OF THE RELATED ART

Portable computers continue to grow in popularity at a more rapid pace than ordinary desktop personal computers (PC's). These notebook or laptop PC's are extremely powerful, having many of the features of state-of-the-art desktop PC's. Recently, multimedia capabilities have been added to laptop PC's. Stereo speakers, a microphone, and FM synthesizers and other audio capabilities are built in to many multimedia laptop PC's.

Docking stations or port replicators have been used to bridge the gap between the capabilities of older laptop PC's and those of desktop systems. Some docking stations allow expansion or AT-bus cards to be plugged into an industry-standard ISA bus giving the laptop expansion abilities like that of a desktop PC. For example, older laptop PC's did not include audio capabilities. Audio capabilities can be added to these laptops by plugging them into a docking station that had a sound card installed in the ISA bus.

Newer laptop PC's often contain the equivalent of a sound card. Since sound cards use many of the same fixed resources such as interrupts (IRQ's), I/O addresses, and DMA channels, it is generally not feasible to have more than one sound card in a PC. Thus, newer multimedia laptops should not be used with a docking station with a sound card unless the laptop's sound card can be disabled. Unfortunately, disabling the sound-card features in a laptop is not always easy or even possible.

DOCKING STATION SOUND CARDS INCOMPATABLE WITH MULTIMEDIA LAPTOPS

The incompatibility of internal laptop sound cards with docking-station sound cards prevents many docking stations from using sound cards. These docking stations support only analog audio; the digital-sound features of most sound cards are not supported.

The laptop's sound system generates and outputs analog audio signals, which are sent to the docking station for playing on external speakers connected to the docking station. Audio mixing is not performed by the docking station. Audio from a CD player in the docking station must be mixed with computer-generated sound by a mixer inside the laptop and then output back out to the external speakers.

DOCKING STATION—FIG. 1

FIG. 1 shows a laptop PC with a docking station, highlighting audio components. Laptop PC 10 is a multimedia laptop with audio features built-in. A user's voice can be picked up by internal microphone 14, which is built in to the laptop's housing. Internal speakers 12 are also built in to the laptop's housing, and provide stereo sound generated by the internal sound card inside laptop PC 10.

While it is convenient to have a built-in internal microphone 14 and internal speakers 12, the small, compact size of laptop PC 10 prevents the use of high-quality audio components. High-fidelity speakers require a large magnet and large-diameter diaphragm sound cones, which simply do not fit inside a laptop PC.

Laptop PC 10 fits into docking station 20. External connectors are provided on the back of laptop PC 10 to make electrical connection with docking-station connectors 16. Digital signals are included in connectors 16 to control an external expansion bus in docking station 20, such as an ISA bus or a PCI bus (not shown). Other peripherals often included in docking station 20 include connections for a printer, modem, external monitor, or network. Since an audio card in docking station 20 would have resource conflicts with the internal sound card in laptop PC 10, a sound card cannot be added to docking station 20. Instead, analog signals output from the sound card in laptop PC 10 are output to connectors 16. These analog audio signals from laptop PC 10 are routed to high-fidelity external speakers 18 connected to docking station 20. It is difficult or impossible for the user to disable the internal speakers without losing significant quality when using the external speakers in the several prior-art systems.

Analog input from external microphone 22 is sent from docking station 20 to laptop PC 10, as can input from other audio sources connected to a line-in (L/IN) input on docking station 20. Digital or analog-signal mixing of these input sources typically cannot be performed in docking station 20. Docking station 20 may also provide audio amplification since a separate power supply is included in docking station 20.

AUDIO NOISE FROM CONNECTORS

FIG. 2 highlights connectors on the back of a laptop PC. Parallel-port connector 32 is used to connect to a printer or other parallel device. Serial-port connector 34 is a D-type plug for connecting an external serial device such as an external modem. Connectors 32, 34 are often used without a docking station. A VGA connector (not shown) is also included in many docking stations for connection to an external CRT monitor.

Docking connector 30 is a special-purpose connector containing a variety of signals for connecting to a docking station. While parallel-port connector 32 and serial connector 34 are industry-standard connectors, docking connector 30 is a proprietary connector. Docking connector 30 is only able to fit docking stations made for the specific manufacturer and model of laptop PC.

Docking connector 30 contains address, data, and control signals for an external PCI or ISA bus in the docking station, allowing expansion cards plugged into the docking station's bus to be controlled by a docked laptop PC. Data from an external DVD or CD-ROM drive in the docking station can also be sent to the laptop PC thorough docking connector 30. Power and ground signals may also be included in docking connector 30. High-speed signals such as digital video data streams are often separated form other signals in docking connector 30 by power or ground signals to act as shielding, preventing cross-talk to adjacent signals.

ANALOG AUDIO SUSCEPTIBLE TO CROSS-TALK NOISE

While analog audio signals from the internal sound card in the laptop PC could be sent through docking connector 30, this is undesirable because of noise injection from high-speed digital signals in docking connector 30. Digital signals operating at high frequencies such as clock signals and video or CD-ROM data streams couple noise into other signals in docking connector 30. Even signals that are not immediately adjacent to the higher-speed signals can suffer from noise injection as common ground signals and the metal housing of the connector can inject noise into all signals in docking connector 30. Thus docking connector 30 is inherently a noisy environment.

Most digital signals have high noise margins, so a moderate amount of noise injection is tolerable. However, analog signals are sensitive to small voltage changes since the voltage level itself conveys the information, such as the sound intensity. Thus, any analog audio signals sent through docking connector 30 suffer from noise injection. The listener notices the noise injection as scratchy or low-quality sounds from any external speakers attached to the docking station.

SEPARATE ANALOG AUDIO CONNECTORS TO DOCKING STATION

The severe noise injection of docking connector 30 prevents inclusion analog audio signals in docking connector 30 for higher-quality docking stations. Instead, separate analog audio connectors 36 are provided to connect analog audio signals from a docked laptop PC to the docking station. Audio connectors 36 are often round plugs or jacks with concentric shielding around one or two signal lines, such as standard audio jacks. For example, a speaker connector has two signal lines for the two stereo speakers, surrounded by a ground.

Often three, four, or five audio connectors 36 are used. Stereo outputs from the laptop PC are contained in a speaker connector, while inputs from the docking station to the laptop PC's sound card are contained in two or three other connectors. These inputs include an external microphone, and external plugs for line-in and line-out signals from a hi-fidelity stereo receiver, tape deck, TV or VCR. Another input audio connector 36 is sometimes included to pass audio from a DVD or CD-ROM drive in the docking station to the laptop PC. Each stereo analog-audio connector has 2 signal lines and one ground, while the mono microphone has one signal and one ground. Thus up to a total of 14 audio signals and grounds can be connected using analog-audio connectors 36.

AUDIO CONNECTORS BULKY & EXPENSIVE

While such separate analog audio connectors 36 are effective in isolating the sensitive audio signals from the noisy digital signals in docking connector 30, audio connectors 36 are relatively expensive. Additionally, audio connectors 36 are designed for large stereo equipment, not for compact portable computers. The large size of audio connectors 36 requires area on the back panel of the laptop PC.

The size of portable computers is limited. Indeed, a primary reason portable PC's are purchased is the small, compact size. Area on the back of the laptop PC is at a premium. Often docking connector 30 and other required connectors 32, 34 for the serial and parallel ports occupy most of the available area on the rear of the laptop PC. Thus, there is little area remaining for audio connectors 36. The large, bulky audio connectors do not easily fit on the back panels of many compact laptop PC's.

SEPARATE AUDIO SYSTEM AND CONNECTOR—FIG. 3

FIG. 3 is a diagram of a docked laptop PC with digital and analog connectors to a docking station. PCI controller 44 in laptop PC 10 controls access to internal or external devices on a PCI bus. A graphics subsystem is also accessed by controller 44. PCI controller 44 generates PCI-bus control signals and addresses and transmits these through docking connector 30 to external PCI controller 46. External PCI controller 46 buffers these address and control signals and drives them onto an external PCI expansion bus in docking station 20. Data from expansion cards on the external PCI bus is returned to PCI controller 44 in laptop PC 10 through docking connector 30.

Digital audio controller 40 is accessed by programs executing on a microprocessor in laptop PC 10. Digital audio controller 40 performs equivalent functions to a sound card. Analog-Digital (A/D) converter 42 converts digital audio signals to analog audio signals and outputs these analog audio signals to audio connector 36. A/D converter 42 also receives analog audio inputs from audio connector 36 and converts then to digital audio signals for processing by digital audio controller 40.

Analog audio signals from audio connectors 36 are connected to external analog audio system 50. Amplification of analog audio signals is performed by external analog audio system 50, which drives external speakers and receives audio inputs from an external microphone and perhaps a line-in plug and a CR-ROM drive.

While separate analog audio connectors reduce the problem of noise injection from high-speed digital signals in the docking connector, these audio signals are still routed through a noisy environment in a small form-factor laptop PC. The audio connectors are relatively expensive and consume valuable area on the rear of the laptop PC. It is desired to eliminate these analog audio connectors from a laptop PC to a docking station while still supporting audio functions in the docking station. It is further desired to have a single sound card or system internal to the laptop PC control audio functions both internal to the PC and external in the docking station. It is desirable to have audio mixing of digital audio signals both internally in the laptop and externally in the docking station.

What is desired is a portable PC containing a sound system that can control sound functions including external mixing in a docking station without using a standard sound card in the docking station. It is desirable to have the functions of a sound card in the docking station while also having the audio functions of a sound card inside the laptop PC, without having the conflicts and compatibility problems of having two sound cards in a PC. It is desirable to drive both internal an external speakers and receive audio inputs from both an internal microphone and an external microphone or line input. It is desired to arbitrarily mix these internal and external audio sources. Digital mixing of both internal and external audio sources is desired.

SUMMARY OF THE INVENTION

An audio system for a portable personal computer (PC) has an internal audio controller that generates digital audio. An internal analog-digital converter converts digital audio from the internal audio controller to analog audio for playing on an internal speaker.

A docking-station connector connects the portable PC to a docking station. The docking-station connector contains high-speed digital signals for communicating data, address, and control to an expansion bus in the docking station. The expansion bus receives expansion cards to expand functions performed by the portable PC when the portable PC is connected to the docking station through the docking-station connector.

An external digital-audio link uses digital signals in the docking-station connector. It sends the digital audio generated by the internal audio controller to the docking station. Digital-audio signals are sent over the external digital-audio link thorough the dockingstation connector. Thus digital audio is generated inside the portable PC and transmitted as digital audio signals to the docking station.

In further aspects of the invention, analog audio signals are not connected from the portable PC to the docking station. Only digital audio signals and not analog audio signals are transmitted to and from the docking station.

In still further aspects a master mixer is coupled to the internal audio controller and to the external digital-audio link. It receives external digital audio from the docking station and mixes the external digital audio with digital audio from the internal audio controller to generate composite digital audio. Thus the composite digital audio is mixed from the external digital audio from the docking station and the digital audio from the internal audio controller.

In further aspects, the internal analog-digital converter is coupled to a built-in microphone and to built-in speakers. The internal analog-digital converter converts analog audio from the built-in microphone to digital audio and converts digital audio to analog audio for playing on the built-in speakers. A music synthesizer generates the digital audio under program control.

The internal audio controller also has an internal mixer that receives digital audio converted by the internal analog-digital converter from the built-in microphone. The internal mixer also receives digital audio from the music synthesizer and digital audio from the master mixer. The internal mixer generates a second composite audio stream from microphone, music synthesizer, and master-mixer audio inputs.

The second composite audio stream is sent to the master mixer for further mixing with external audio sources. Thus audio mixing is performed by the internal audio controller and by the master mixer. The master mixer is further coupled to an internal bus for storing digital audio on a hard disk or a main memory.

BRIEF DESCRIPTION OF THE DRAWINGS

FIG. 5 shows that the master mixer inside the portable PC mixes inputs from four sources: internal and external audio controllers, the zoom-video port, and the PCI bus.

FIG. 6 is a diagram of an external audio controller that uses the AC97 standard CODEC and analog mixer.

DETAILED DESCRIPTION

The present invention relates to an improvement in portable PC audio systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a digital audio interface to a docking station is desirable. Digital audio signals are not sensitive to noise and can therefore be located in the docking connector with other digital signals, eliminating the separate audio connectors between the PC and the docking station. However, such a digital-audio interface to a docking station is not currently available as only one sound card can be installed on a PC. Two sound cards would create resource conflicts for the sound-system's IRQ and DMA channels.

MASTER MIXER CONTROLS BOTH INTERNAL AND EXTERNAL AUDIO

Without adding sound cards to the PC, the inventors put audio capabilities in both the laptop PC and the docking station. A master mixer is added to the laptop's internal sound system to coordinate audio functions in both internal and external audio systems. Resource conflicts are avoided by using the master mixer, which controls both internal and external audio systems. The external audio system does not use system resources such as IRQ interrupts and DMA channels; instead, the external audio system is a slave to the internal audio system that controls these resources.

Figure 1:
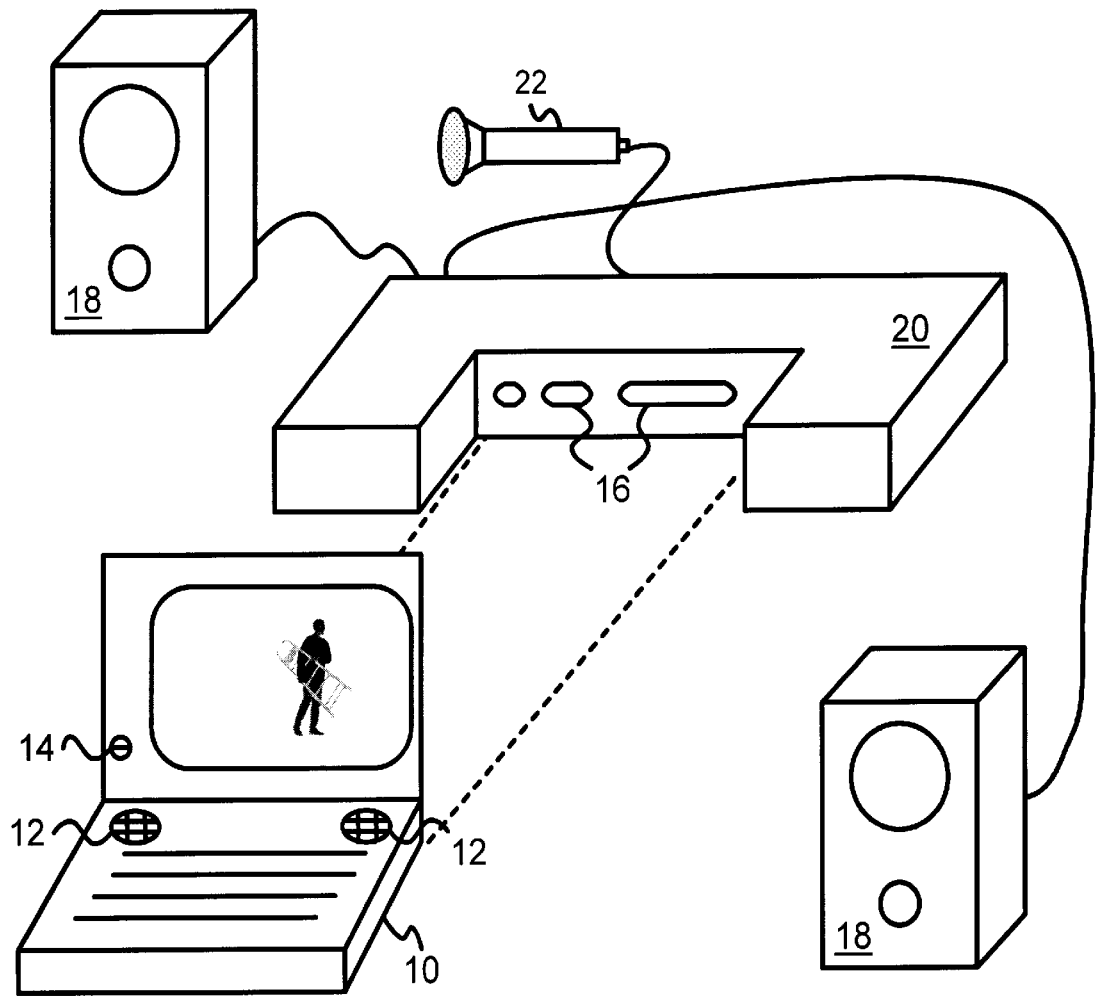
FIG. 1 shows a laptop PC with a docking station, highlighting audio components.
Figure 2:
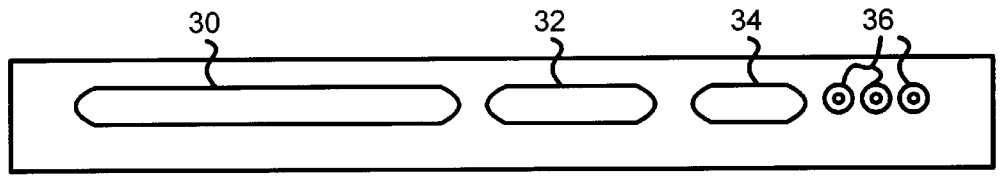
FIG. 2 highlights connectors on the back of a laptop PC.
Figure 3:
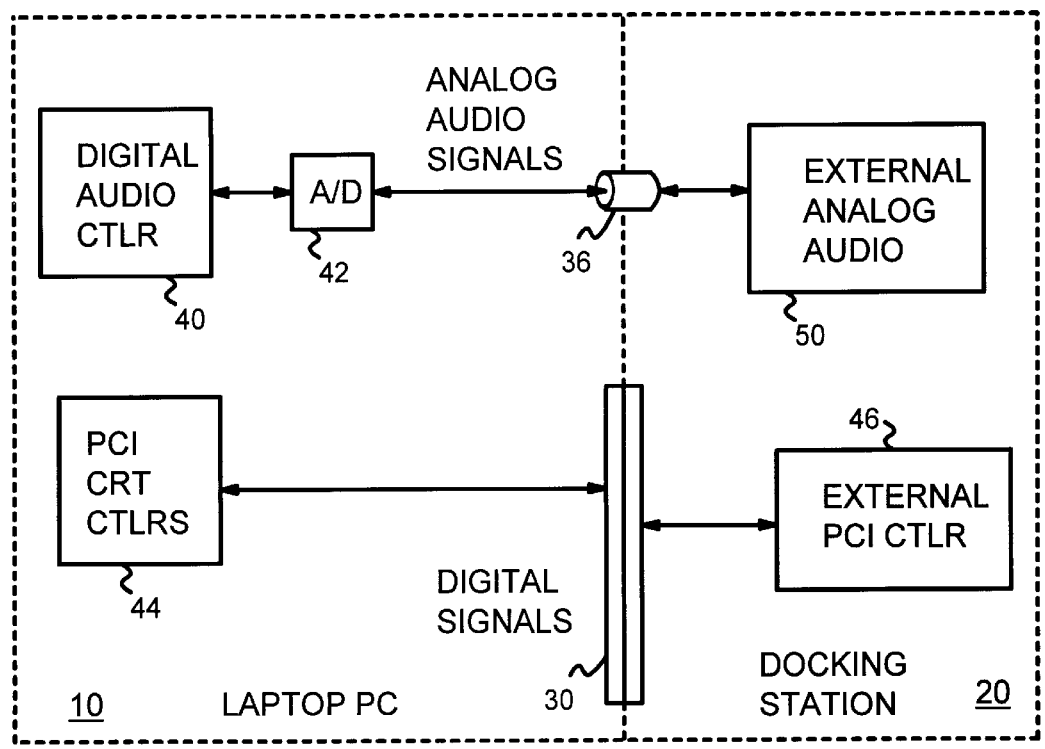
FIG. 3 is a diagram of a docked laptop PC with digital and analog connectors to a docking station.
Figure 4:
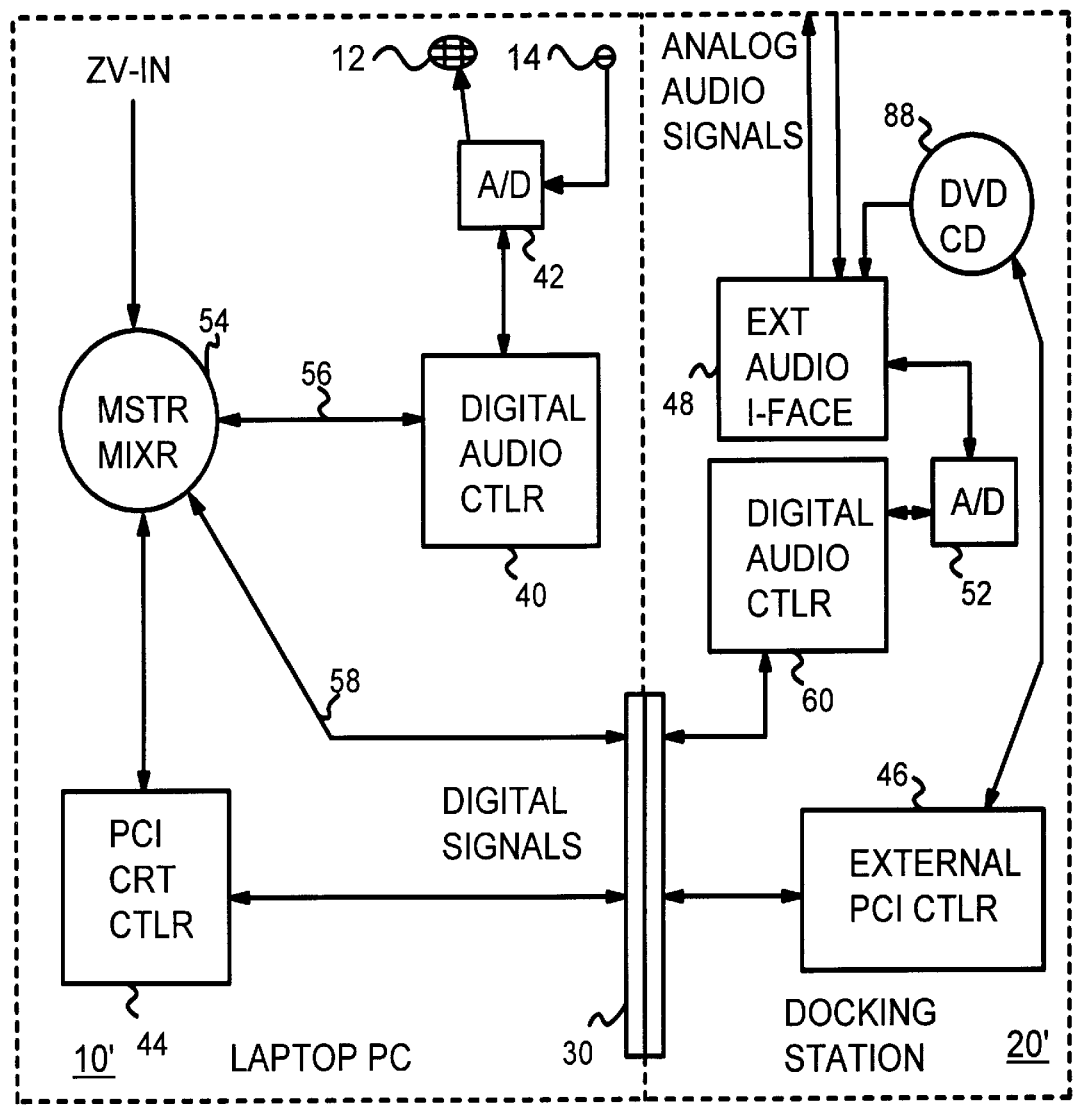
FIG. 4 is a block diagram of a docked laptop PC with a master mixer for controlling an internal and an external audio system in the docking station.

FIG. 4 is a block diagram of a docked laptop PC with a master mixer for controlling an internal and an external audio system in the docking station. Ordinary components of laptop PC 10' such as a microprocessor, memory, hard disk, video display system, keyboard, etc., are not shown. PCI controller 44 controls an internal PCI expansion bus, which includes a graphics system, disk-drive controller and other standard components. Some of the PCI bus signals are sent to external PCI controller 46 in docking station 20' through docking connector 30'. Docking connector 30' is a large connector plug and socket with 100 or more signal pins or leads.

External PCI controller 46 interfaces to user-installed expansion cards in an external PCI bus in docking station 20'. A digital-video-disk (DVD) or CD-ROM drive 88 is also connected to external PCI controller 46. Peripherals installed on an external PCI or ISA bus controlled by external PCI controller 46 can be accessed by programs executing on laptop PC 10' using internal PCI controller 44. Thus, the internal PCI bus is effectively expanded to include those peripherals installed in docking station 20'.

Digital audio controllers and A/D converters are located both inside laptop PC 10' and externally in docking station 20'. Rather than communicate directly with each other, the internal and external audio controllers must send and receive digital audio signals through master mixer 54.

Master mixer 54 is the heart of the combined audio system of laptop PC 10' and docking station 20'. Audio input and output (I/O) signals reach master mixer 54 from internal digital audio controller 40, and from external digital audio controller 60. Since digital audio signals are transferred to and from master mixer 54, the audio signals from external digital audio controller 60 to master mixer 54 are digital signals. Thus, digital audio signals are transmitted across the interface between docking station 20' and laptop PC 10' through docking connector 30'. Noise from high-speed digital signals in docking connector 30' do not degrade audio quality because digital audio signals have the same high noise margins that all digital signals have.

Master mixer 54 also receives audio inputs from a zoom-video (ZV) port. A ZV input plug is provided on laptop PC 10' for plugging into a ZV-compatible video device such as a PCMCIA card, a modem, or network card or an external camera/microphone. The audio components are separated from the video received from the ZV port, and the ZV audio (known as $I^2S$, integrated sound digital serial interface), is input to master mixer 54 for further processing and possibly storage.

Master mixer 54 is also connected to the internal PCI bus and PCI controller 44. Audio can be saved to memory or disk for later playback or processing by outputting digital audio from master mixer 54 to the internal PCI bus and to PCI controller 44. Stored digital audio can also be retrieved and sent from PCI controller 44 to master mixer 54. This stored audio can be altered and mixed with other audio sources under program control. Thus the audio signals of laptop PC 10' can be extensively modified by computer-controlled editing and special effects.

Digital audio must be converted to analog signals to be heard from analog speakers or headphones. Internal A/D converter 42 receives digital audio signals from internal digital audio controller 40 and converts digital audio outputs to analog audio. The analog audio is then amplified and output to the internal speakers 12 built in to the housing of laptop PC 10'. Internal A/D converter 42 receives analog audio from internal microphone 14 which is also built into the housing of laptop PC 10'. Internal A/D converter 42 converts the analog audio to digital audio and transmits the digital audio to master mixer 54.

External A/D converter 52 is located inside docking station 20'. Digital audio signals from external digital audio controller 60 are converted to analog audio outputs and transmitted to external speakers through external audio interface 48. External audio interface 48 may include amplifiers for driving large, high-quality external speakers. External audio inputs such as from an external microphone or from an external line-in jack are received by external audio interface 48 and converted to digital audio by A/D converter 52 and sent to external digital audio controller 60.

INTERNAL AND DOCKING-STATION AUDIO MIXED BY MASTER MIXER

FIG. 5 shows that the master mixer inside the portable PC mixes inputs from four sources: internal and external audio controllers, the zoom-video port, and the PCI bus. Master mixer 54 is a digital mixer capable of combining digital-audio data streams to produce composite audio streams. Audio streams include external audio link 58 from the docking station and internal audio link 56 from the laptop's internal digital audio controller. Both internal and external audio streams are received by master mixer 54. Master mixer 54 receives digital-audio data streams from four sources:

1. Internal Digital Audio Controller inside Laptop PC
2. External Digital Audio Controller in Docking Station
3. Zoom-Video Port Audio Stream From External Video Feed
4. Internal PCI Bus to Laptop's Microprocessor.

These audio data streams can be mixed together in a variety of ways. While the ZV port is input-only, the other three ports are bi-directional and data streams can be output to them from master mixer 54. For example, the internal audio controller can receive a composite output from master mixer 54 of the ZV port audio mixed with the PCI-bus audio and the external audio from the docking-station audio controller. Likewise, the external audio controller can receive a composite output from master mixer 54 of the ZV port audio mixed with the PCI-bus audio and the internal audio.

The PCI bus can receive data streams from any of the other three ports, or receive a mix using an external mixer or loop-back. This allows audio data streams to be stored on the laptop's hard disk. The stored audio can later be read back to master mixer 54 from the PCI bus and combined with other inputs to produce a composite audio stream. To store a mixed stream, audio is sent through the master mixer and out to the internal audio controller and then back through mux 70 in master mixer 54 to the PCI bus. The PCI bus can also have the Accelerated Graphics Port (AGP) extension to increase the bandwidth of graphics pixel transfers.

AC97 AUDIO CODEC AND LINK

While any digital audio controller and A/D converter can be used with the invention, a new industry-standard for audio systems in personal computers has emerged. This new standard is known as the Audio-CODEC '97 (AC97) standard. The standard defines an audio coder-decoder (CODEC), a type of A/D converter for use with the standard's digital-audio encoding. The standard's goal is to improve low-cost PC audio to a 90 dB signal-to-noise ratio.

The standard defines two silicon chips. One chip has the AC97 CODEC with an analog mixer. A second chip has digital-audio features and a digital mixer. A digital-audio link between the two chips is also defined. This link is a bi-directional, serial digital-audio link having five wires: serial data in, serial data out, a bit-clock, a sync signal, and a reset signal.

The inventors have realized that this AC97 link is a suitable digital-audio link for communicating digital audio to the master mixer and through the docking connector. Furthermore, as AC97 chips become available, such chips can be used as audio controllers and as A/D converters linked to the master mixer by a digital-audio link that follows the 5-wire signal assignments of the AC97 standard. Thus while any digital-audio link can be used, it is beneficial to adapt the new standard's link for use with the invention.

EXTERNAL AUDIO SYSTEM

FIG. 6 is a diagram of an external audio controller that uses the AC97 standard CODEC and analog mixer. External audio controller 86 is connected to master mixer 54 by a 5-wire digital-audio serial link using the AC97 protocol. AC97 interface 99 sends and receives serial data from external audio link 58, which follows the AC97 digital-audio standard's protocols. AC97 interface 99 generates a bit-clock signal for the serial data output and samples the serial data input at a 48 kHz rate. Since user's can only hear sounds up to about 20 kHz, the 48 kHz sample rate is sufficient for audio signals.

CODEC 94 is an A/D converter which operates at a 48 kHz sampling rate, following the AC97 encodings. CODEC 94 sends digital audio output to AC97 interface 99 and receives digital audio signals from AC97 interface 99.

Analog mixer 92 receives analog audio signals converted by CODEC 94 and mixes these analog signals with analog audio inputs from an external microphone or line-in jack on the external docking station. A CD-ROM audio input may also be mixed in. Analog mixer 92 mixes these analog inputs and produces a mixed analog output. The mixed analog output from analog mixer 92 is amplified and output to external speakers attached to the SPKR plug on the docking station.

The mixed analog output from analog mixer 92 is also input to CODEC 94 for conversion to digital audio. The converted digital audio can then be transmitted to master mixer 54 over external audio link 58. Thus audio input from an external microphone, CD-ROM, or line-in jack on the docking station can be mixed and converted to digital audio and transmitted through the docking connector to the master mixer in the laptop PC as digital audio.

INTERNAL AUDIO CONTROLLER—FIG. 7

Figure 7:
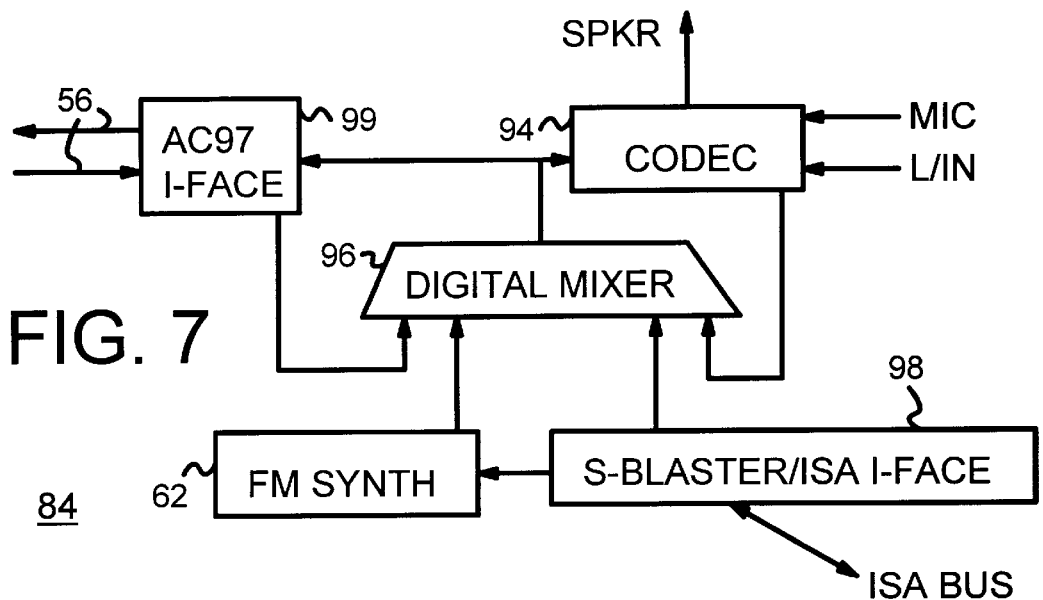
FIG. 7 is a diagram of an internal audio controller for communicating with a master mixer in the laptop PC.

FIG. 7 is a diagram of an internal audio controller for communicating with a master mixer in the laptop PC. Internal audio controller 84 performs the functions of digital audio controller 40 and A/D converter 42 of FIG. 4. Legacy audio functions such as SoundBlaster emulation are also performed by internal audio controller 84 using SoundBlaster/ISA interface 98, which contains programmable registers emulating SoundBlaster hardware. An interface to an ISA (AT) bus is also included for the SoundBlaster emulation. FM synthesizer 62 is a music synthesizer, and can be programmed to generate music or sound. Such computer-generated music is fed to digital mixer 96, which may also receive digitized audio inputs from SoundBlaster/ISA interface 98.

Digital mixer 96 also receives internal audio inputs such as from an internal microphone, CD-ROM, or line-in jack, which are first converted from analog to digital by CODEC 94. CODEC 94 follows the AC97 standard. CODEC 94 receives the mixed output from digital mixer 96 and converts it to analog audio, which is amplified and output to the laptop PC's internal speakers.

Internal audio controller 84 can operate independently with digital mixer 96 and CODEC 94, outputting audio to the laptop's built-in speakers or a user's headphones and receiving audio input from a microphone built-in to the laptop. However, the audio system becomes much more powerful when connected to the external audio system through the master mixer. AC97 interface 99 receives the mixed output from digital mixer 96 and outputs it using a 48 kHz sample-rate clock to internal audio link 56. Internal audio link 56 uses the AC97 protocol 5-wire link to transmit and receive digital audio from master mixer 54. Digital audio received from the master mixer over internal audio link 56 is sent to digital mixer 96 by AC97 interface 99. Thus internal audio link 56 enables digital mixer 96 to mix in audio from the docking station or from other sources external to the laptop PC.

INTERNAL AND EXTERNAL DIGITAL AUDIO LINKS

Figure 8:
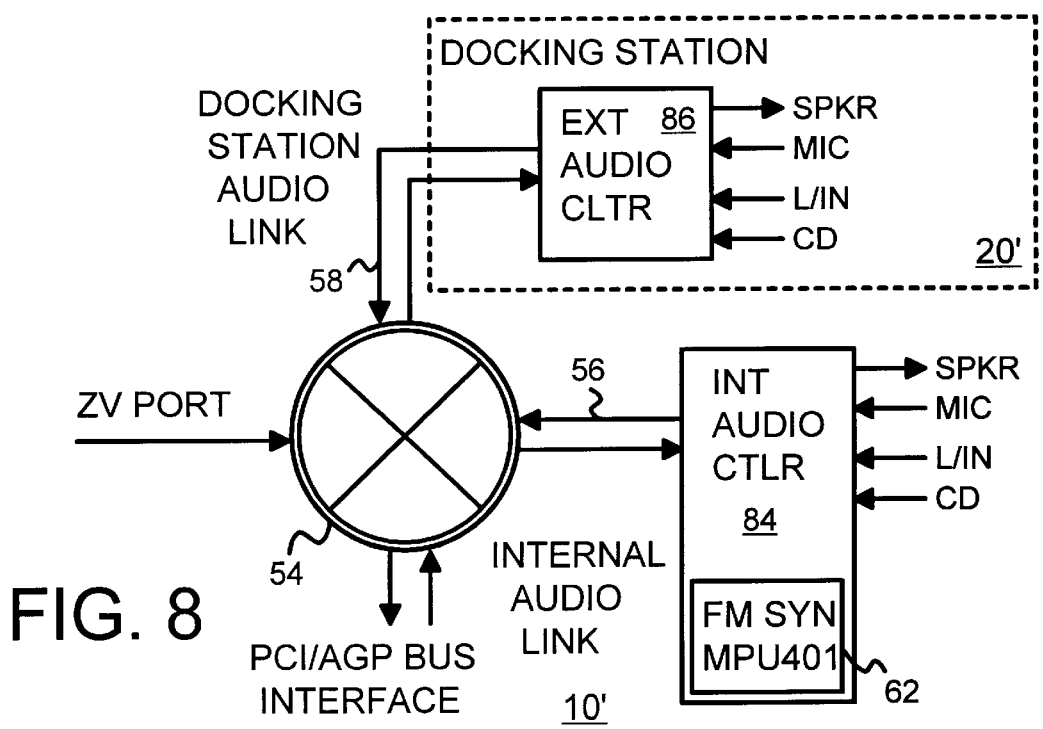
FIG. 8 is a diagram of digital-audio links from the master mixer to internal and external digital audio controllers.

FIG. 8 is a diagram of digital-audio links from the master mixer to internal and external digital audio controllers. Master mixer 54 receives audio input from a ZV port, and sends and receives digital audio to the PCI/AGP bus. External audio link 58 connects master mixer 54 to external audio controller 86 while internal audio link 56 connects master mixer 54 with internal audio controller 84. Internal audio controller 84 and external audio controller 86 each include standard AC97 CODECs for analog-digital conversion.

Furthermore, each of internal audio controller 84 and external audio controller 86 has mixing capabilities. Internal audio controller 84 contains digital mixer 96 (FIG. 7), while external audio controller 86 contains analog mixer 92 (FIG. 6). Master mixer 54 also performs mixing, so mixing can occur in three locations:

1. Inside Laptop PC 10' in internal audio controller 84
2. Inside Laptop PC 10' in master mixer 54
3. In Docking Station 20' in external audio controller 86.

Mixed audio signals can be output to the external speakers attached to docking station 20' through external audio controller 86, and to internal speakers built-in to laptop PC 10', using internal audio controller 84. Audio signals mixed in either internal audio controller 84 or external audio controller 86 can also be routed to master mixer 54 and output to the PCI bus for storage by main memory or hard disk.

Audio inputs for mixing include an external microphone, line-in jack, and DVD/CD-ROM audio in docking station 20', which are input and digitized by external audio controller 86. A built-in internal microphone, line-in jack, and CD audio are input to internal audio controller 84. Thus both internal and external audio sources can be mixed.

External digital audio from the external digital audio controller is transferred from the docking station through the docking connector to master mixer 54 over external audio link 58. Internal digital audio from the internal digital audio controller is transferred to master mixer 54 over internal audio link 56. Thus master mixer 54 receives audio from both internal and external sources, providing mixing of internal and external audio sources.

Synthesized music and other computer-generated audio from FM synthesizer 62 are also input to the mixer in internal audio controller 84. These computer-generated audio sources can be mixed in the same fashion as other internal audio sources.

INTERNAL DETAILS OF MASTER MIXER—FIG. 9

Figure 9:
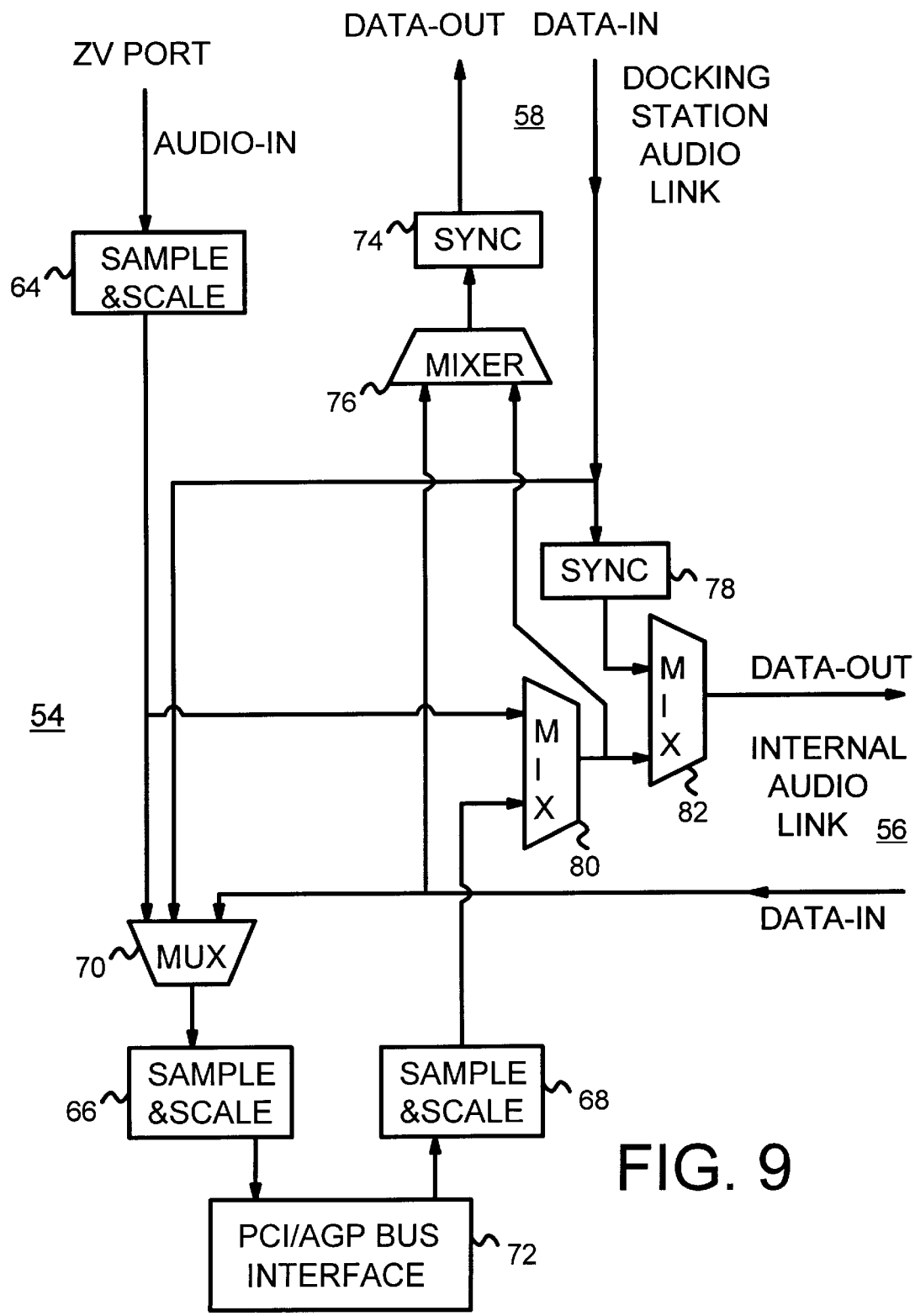
FIG. 9 is a diagram of the master mixer inside the laptop PC, which receives digital audio from internal and external audio controllers.

FIG. 9 is a diagram of the master mixer inside the laptop PC, which receives digital audio from internal and external audio controllers. Master mixer 54 has bi-directional connections to internal audio link 56 and external audio link 58, and to the PCI bus through PCI interface 72. Integrated $I^2S$ audio from a zoom-video (ZV) port is also received.

ZV audio is received and sampled at the 48 kHz sample rate of the digital-audio links. Scaler 64 samples the ZV audio input and scales the amplitude of the input for volume control. Scaler 64 therefore performs sample-rate conversion from the ZV rate to the AC97's 48 kHz sample rate. The sampled and scaled ZV audio is input to PCI mux 70 and to PCI mixer 80.

PCI mux 70 can select one of its three inputs to be outputted to the PCI bus by PCI interface 72. PCI mux 70 can select the sampled and scaled ZV audio for storage by the laptop's hard disk, or either internal or external digital-audio from internal audio link 56 or external audio link 58. The serial-data inputs from the 5-wire AC97 audio links are connected to PCI mux 70. Sampler 66 converts the 48 kHz sample rate of these inputs to PCI mux 70 to another sample rate (such as 8, 16, 24, 11, 22, or 44 kHz) before transfer to the PCI bus. This allows the audio signals to be compressed for storage. Sampler 66 can also scale the signals to control volume.

Stored audio can be read to the PCI bus and to PCI interface 72 when it is desired to play back the stored audio or perform additional mixing. Input sampler 68 converts the stored audio from PCI controller 72 to the 48 kHz sample rate and can also scale the audio by adjusting the digital values representing the amplitude of the audio signals. Scaling is performed on the digital audio by multiplication with a constant value or scalar. The scaled audio from input sampler 68 is input to PCI mixer 80 for mixing with any ZV audio received. PCI mixer 80 combines digital audio values from ZV audio and the PCI bus by adjusting the digital values to produce a composite digital value, which has a desired fraction of each input signal. The desired fraction of each audio input mixed in is programmable and controlled by the user through mixer software. Digital mixing can be performed by signed addition of the digital-audio streams in two's complement format.

External-output mixer 76 receives the mixed ZV and PCI output from PCI mixer 80, and then mixes in internal audio from the serial-data input wire of internal audio link 56. The serial data input from the internal audio controller might itself have been mixed, rather than just being from one of the internal audio sources. External-output synchronizer 74 synchronizes the mixed output from external-output mixer 76 and outputs the serial-out line to the docking station. The serial output is synchronized to the 48 kHz sample-rate transmitted in the 5-wire external audio link 58 as the bit-clock of 12.288 MHz. This re-synchronization is necessary because a different clock source is used for the link and for mixer 76. The separately-generated clocks may be out of phase even when they have the same frequency.

The serial-data input from external audio link 58 is also re-synchronized by synchronizer 78, and input to internal-output mixer 82. Internal-output mixer 82 mixes the combined ZV and PCI audio from PCI mux 80 with the external audio from the docking station's audio controller. Internal-output mux 82 outputs a mixed audio signal as the serial-data output in the 5-wire internal audio link 56 to internal audio controller 84 shown in FIG. 7. Thus ZV-audio mixed with PCI audio and external audio from the docking station can be output to the internal audio controller from master mixer 54.

MODES OF OPERATION—FIG. 10

FIGS. 10A–H highlight various configurations of internal and external audio sources and outputs for a laptop PC with a master mixer and an external audio controller in a docking station. A wide variety of configurations and modes of operation of the audio system is possible and some of these configurations are shown in FIGS. 10A–H to illustrate the flexibility and power of the inventors' audio system. Dotted lines in FIGS. 10A–H indicate idle or unused signal paths for that mode illustrated.

Figure 10A:
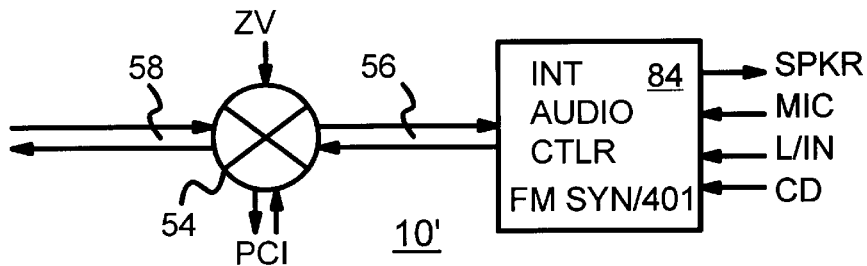
FIGS. 10A–H highlight various configurations of internal and external audio sources and outputs for a laptop PC with a master mixer and an external audio controller in a docking station.

In FIG. 10A, laptop PC 10' is not docked and only internal audio features are available. Audio from the built-in internal microphone, CD audio from a built-in CD player, and audio input to a line-in jack are mixed in the digital mixer in internal audio controller 84 before being sent over internal audio link 56 to master mixer 54. Master mixer 54 then mixes the composite audio from internal audio controller 84 with audio from the ZV port and stored audio from the PCI bus. The resulting mixed audio stream can be stored to disk as an audio clip through the PCI bus. Alternately, the mixed audio stream can be re-transmitted back over internal audio link 56 to internal audio controller 84 for playing on the internal speakers built into the laptop's housing.

Stored audio clips, or ZV-audio input may also be transmitted over internal audio link 56 to internal audio controller 84 for playback on the internal speakers. Thus a rich set of audio features exist even when laptop PC 10' is not docked.

Docking laptop PC 10' greatly expands the audio capabilities of laptop PC 10'. In FIGS. 10B–10H, laptop PC 10' is docked with docking station 20', and the additional features controlled by external audio controller 86 are available.

Figure 10B:
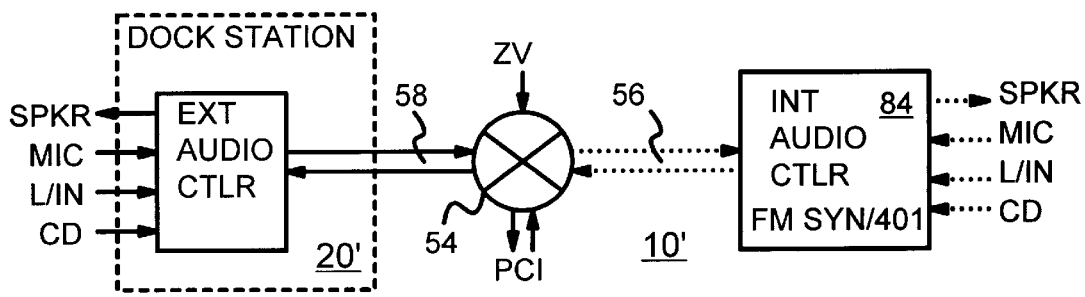

In FIG. 10B, the audio functions of docking station 20' are exclusively use. None of the internal features of internal audio controller 84 is used. Audio from the higher-quality external microphone, CD audio from an external DVD/CD player, and audio input to a line-in jack are mixed in the analog mixer in external audio controller 86 before being sent over external audio link 58 to master mixer 54. Master mixer 54 then mixes the composite audio from external audio controller 86 with audio from the ZV port and stored audio from the PCI bus. The resulting mixed audio stream can be stored to disk as an audio clip through the PCI bus. The mixed audio stream also can be re-transmitted back over external audio link 58 to external audio controller 86 for playing on the high-quality external speakers. Stored audio clips, or ZV-audio input may also be transmitted over external audio link 58 to external audio controller 86 for playback on the external speakers.

INTERNAL AND EXTERNAL AUDIO SOURCES COMBINED

Figure 10C:
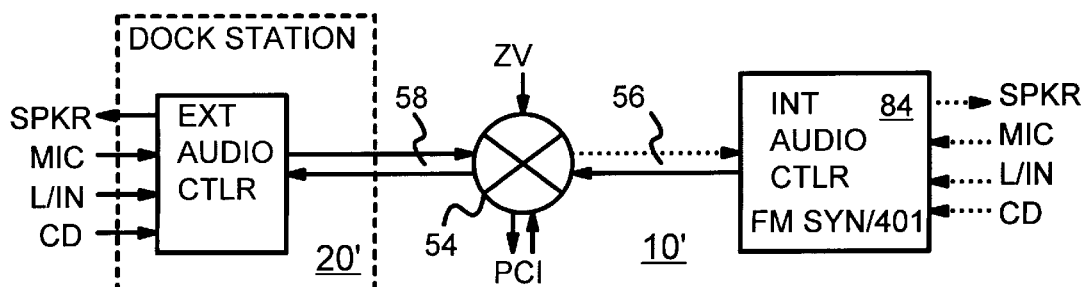

While using the higher-quality audio components of docking station 20' is often desirable, some audio resources are only available inside laptop PC 10'. For example, SoundBlaster-compatible audio, FM synthesized music, and MPU401-generated sound are not available externally, as IRQ and DMA conflicts prevent two copies of these legacy audio components from existing on a single PC. FIG. 10C shows that FM synthesized music and MPU401-generated sounds generated from internal audio controller 84 are transmitted over internal audio link 56 to master mixer 54. At the same time, external audio from external audio controller 86 in docking station 20' is received over external audio link 58.

Master mixer 54 can combine both the external audio from the external microphone, CD, or line input with the FM synthesized music from the internal audio system. The combined audio from master mixer 54 can then be sent back out to external audio controller 86 over external audio link 58 for playback on the external speakers.

Figure 10D:
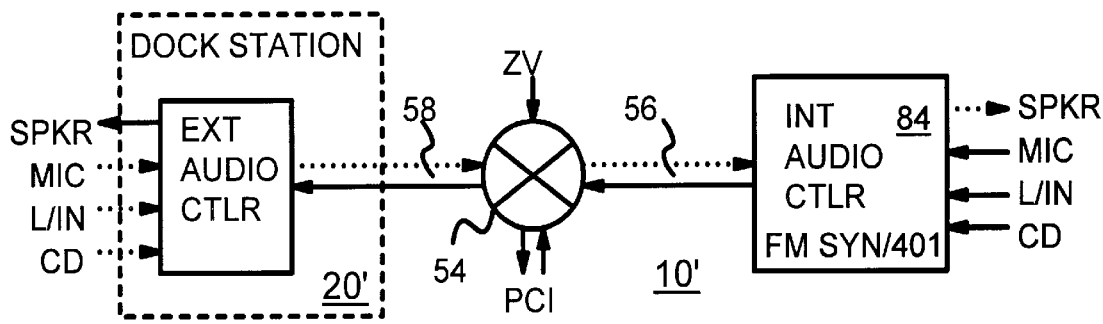

FIG. 10D shows the internal audio sources being played back on the external speakers. Audio input from the internal microphone, CD player, FM synthesizer, or line-in can be locally mixed by the digital mixer in internal audio controller 84 before transmission over internal audio link 56 to master mixer 54. Master mixer 54 can further mix these inputs with ZV audio or PCI stored audio. The resulting mix of internal audio sources is then transmitted over external audio link 58 to external audio controller 86 for playing on the high-quality external speakers connected to docking station 20'.

Of course, not all of these inputs have to be used at the same time; only one or two audio sources are typically enabled, such as the FM synthesizer combined with a stored voice clip transmitted over the PCI bus. Additionally, music from the ZV port could be played on the external speakers while audio from the line-in jack or internal microphone is simultaneously being stored. Thus two operations can be performed simultaneously by the audio system as long as the paths through master mixer 54 do not overlap.

SIMULTANEOUS PLAYBACK ON INTERNAL AND EXTERNAL SPEAKERS

Figure 10E:
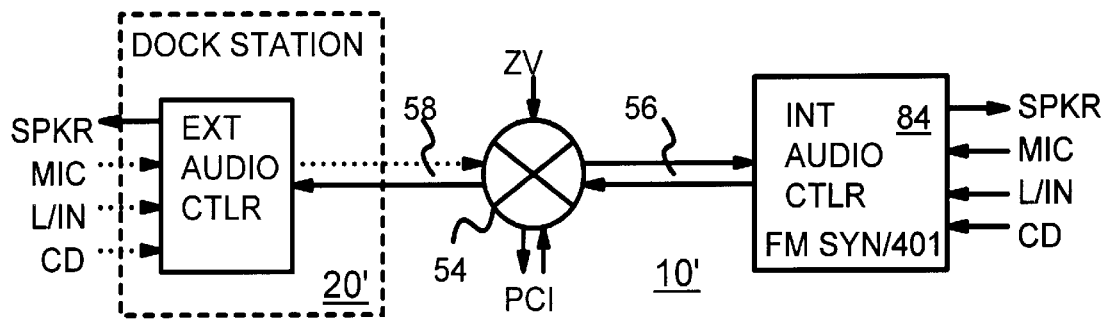

FIG. 10E shows audio playback to both the external and internal speakers. Normally, the higher-quality external speakers are enabled while the lower-quality internal speakers are disabled when laptop PC 10' is docked. However, there are some applications where it is desirable to use both sets of speakers. Surround sound is an application using both internal and external speakers. In another application, during a presentation to a large group, the docking station may be connected to a public-address system rather than to smaller external speakers. It may then be desirable to simultaneously play audio on the internal speakers as well as the external public-address system's speakers.

Stored audio from the PCI bus can be sent from master mixer 54 to the internal speakers connected to internal audio controller 84 over internal audio link 56. The audio is also sent from master mixer 54 over external audio link 58 to external audio controller 86, which drives the external speakers or external public-address system.

Figure 10F:
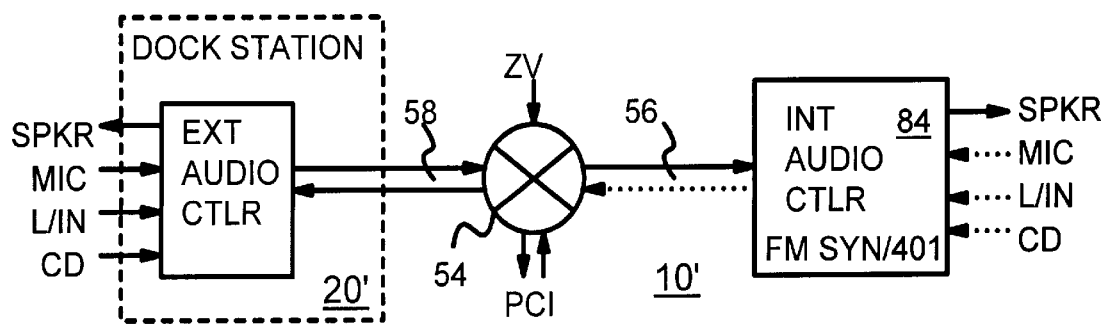

The audio inputs or the internal FM synthesizer can be used to generate the audio, for playback on both internal and external speakers. FIG. 10F is a variation of simultaneous playback on internal and external speakers wherein the external audio inputs are used rather than the internal audio inputs. Stored audio from the PCI bus can be played back to both internal and external speakers, while an external audio source such as an audience microphone is stored. This allows the presentation's pre-recorded audio to be played, while audience questions and comments are stored for later review.

Of course, FM synthesized music is not available in this mode since the external audio system is prevented by resource conflicts from containing a second FM synthesizer.

MIXED INPUTS—FIGS. 10G, 10H

Sometimes it is desired to mix an internal input with an external input. For example, a user could be making an instructional video. Another group has made the video with background music and the user is to add narration to the video. The user can play the video on a VCR or CD-ROM attached to docking station 20', while talking into the internal microphone to add narration. The audio from the external CD-ROM is received by the CD input of external audio controller 86, or from a VCR attached to the line-in jack of the docking station. The user's narration is picked up by the internal microphone and sent over the MIC input to internal audio controller 84. The narration is sent over internal audio link 56 to master mixer 54, while the video's audio is sent over external audio link 58 to master mixer 54. Master mixer 54 combines the narration and the background music and transmits the mixed audio to the PCI bus for storage. The stored composite audio can later be written as the audio for the final video.

Figure 10G:
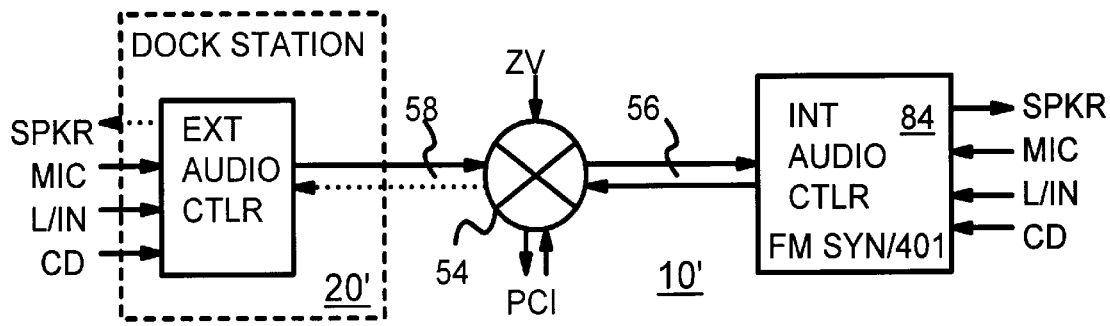
Figure 10H:
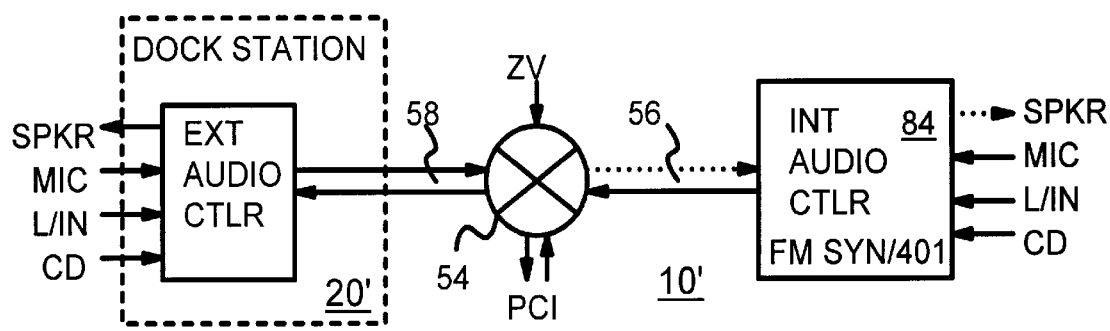

Thus internal and external audio sources can be mixed together into a single audio stream. If desired, audio can be played either on internal speakers, as shown in FIG. 10G, or on external speakers, as shown in FIG. 10H. The zoom-video audio input to master mixer 54 could also be used for the instructional video's audio source.

INTERVIEW WITH TWO PEOPLE

The configurations of FIGS. 10G, 10H can also be used when the user is interviewing a second person. The user can talk directly into the internal microphone, while typing notes to looking up information on laptop PC 10'. The second person can be talking into an external microphone connected to docking station 20'. Master mixer 54 mixes the voices of the user and the second person that are received from the internal and external audio controllers. Such an arrangement allows both person's voices to be recorded by a separate microphone. Sound quality is improved since each microphone can be adjusted to point directly at each person's mouth to minimize pickup of background noise.

ADVANTAGES OF THE INVENTION

Many other combinations of the audio inputs playing on the internal and/or external speakers are possible as the invention is highly flexible. Audio sources from the external docking station or from internal sources can be freely mixed together.

Noise from high-speed digital signals in docking connector 30' do not degrade audio quality because digital audio signals have the same high noise margins that all digital signals have. Using digital audio signals rather than analog audio signals allows high-quality sound to be transferred to and from the external docking station and the laptop PC. Thus high-quality external audio does not have to suffer from quality degradation as it is transferred across the docking station interface to the laptop PC.

Expensive analog audio jacks and connectors in the docking station connectors are no longer needed for docking. Having a single connector, or reducing the number of connectors than must be mated together, facilitates docking as it is easier to fit the connectors together. Audio jacks are difficult to plug together, often requiring more force than digital connectors. Thus eliminating these dedicated audio jacks makes it easier for a user to plug his laptop PC into the docking station.

ALTERNATE EMBODIMENTS

Several other embodiments are contemplated by the inventors. For example other busses besides the PCI bus can be used, such as the ISA (AT) bus or the VESA bus. Extended bus architectures are also contemplated, such as the AGP extension. Other arrangements of the functional blocks in the master mixer can achieve the same or similar results, or may have somewhat different capabilities.

Some portable PC's have analog audio jacks for directly connecting the user's audio equipment, such as headphones or an external microphone or line-in input. These audio jacks bypass the docking station and can be used with the invention as additional internal audio inputs and outputs besides the built-in internal microphone and speakers. Other audio sources beyond those described herein can be used with the invention. Additional computing resources and audio-processing capabilities are anticipated.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A docked laptop personal computer (PC) docked in a docking station comprising:

an internal bus inside the docked laptop PC, the internal bus for transferring data to a hard disk and to a main memory for storage under program control by a program executing on a microprocessor;

an external bus in the docking station, the external bus having a plurality of slots for accepting user-installed expansion boards for adding functions to the docked laptop PC only when docked at the docking station;

a docking connector mounted on a rear panel of the docked laptop PC for connecting the internal bus to the external bus so that the external bus operates under program control by the program executing on the microprocessor in the docked laptop PC;

an internal audio controller having an internal analog-digital converter for converting analog audio input from a built-in microphone mounted in a housing of the docked laptop PC to internal digital audio, the internal analog-digital converter also converting internal digital audio to analog audio for generating sound from built-in speakers mounted in the housing of the docked laptop PC;

an external audio controller inside the docking station, having an external analog-digital converter for converting analog audio input from an external microphone connected to the docking station to external digital audio, the external analog-digital converter also converting the internal digital audio to analog audio for generating sound from external speakers connected to the docking station; and a digital-audio link using unused connector leads in the docking connector for transferring the external digital audio to the docked laptop PC and for transferring the internal digital audio from the docked laptop PC to the external audio controller in the docking station, the unused connector leads not being used for connecting the internal bus to the external bus;

a master mixer inside the docked laptop PC, coupled to the digital-audio link and to the internal audio controller through a second digital-audio link, for mixing the internal digital audio with the external digital audio;

wherein the master mixer is connected to the internal bus, and wherein mixed internal and external digital audio is transferred over the internal bus for storage by the hard disk or by the main memory;

wherein the digital-audio link through the docking connector comprises a serial data-out line and a serial data-in line and a bit clock for synchronizing serial transfer of digital audio, whereby internal and external digital audio is transferred between the docked laptop PC and the docking station through the docking connector for connecting the internal and external buses and whereby internal and external audio is mixed inside the docked laptop PC and bi-directional transfer of serialized digital audio signals occurs in the digital-audio link to the docking station.

2. The docked laptop PC of claim 1 wherein the master mixer is also connected to receive an audio stream attached to video received from a zoom-video port, the master mixer for mixing the audio stream with the external or internal digital audio.

3. The docked laptop PC of claim 1 wherein the external digital-audio link comprises five lines using an AC97 protocol and wherein the external analog-digital converter is an AC97 CODEC.

4. The docked laptop PC of claim 1 further comprising:

an FM synthesizer and a sound-blaster-compatible MPU401 sound controller in the internal audio controller for generating the internal digital audio under program control;

wherein the external audio controller does not contain a sound-blaster-compatible sound controller, whereby no resource conflicts exist between the internal audio controller and the external audio controller.

5. The docked laptop PC of claim 1 wherein the rear panel of the docked laptop PC has the docking connector and a serial-port connector and a parallel-port connector and a connector for an external CRT display monitor, wherein the rear panel of the docked laptop PC does not contain any analog-audio connectors and wherein analog-audio signals are not transmitted through the docking connector.

6. The docked laptop PC of claim 1 wherein the external speakers are larger in size and higher in sound quality than the built-in speakers in the housing of the docked laptop PC.

* * * * *